Nov. 19, 1946.    M. J. ANDERSON    2,411,407
CONVEYER SYSTEM
Filed May 9, 1944    8 Sheets-Sheet 1
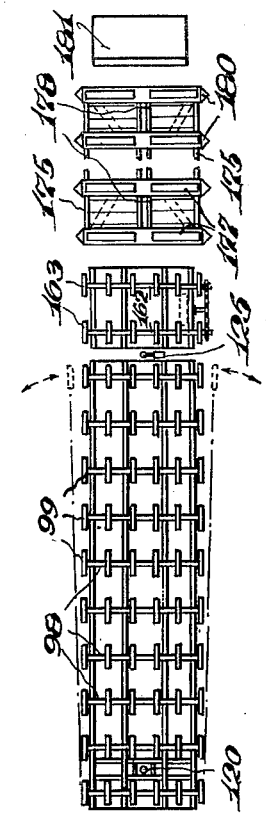
Fig. 1
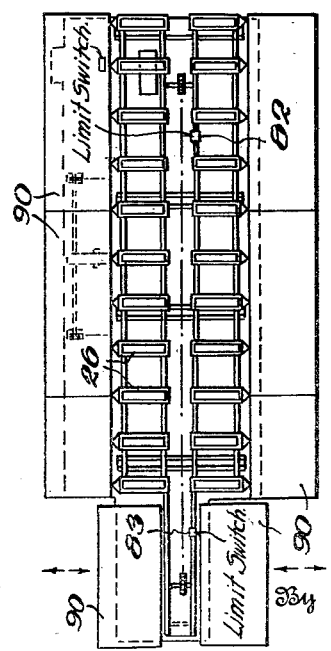
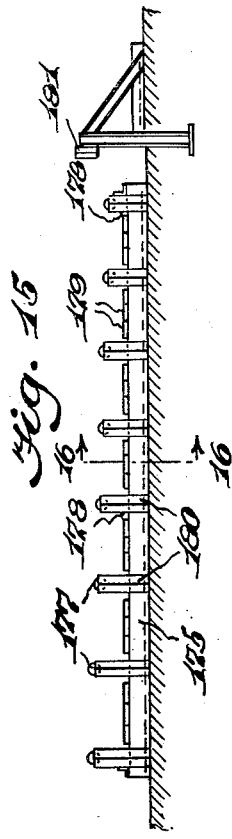
Fig. 15
Inventor
M. J. Anderson
By Arthur M. Kahn
Attorney

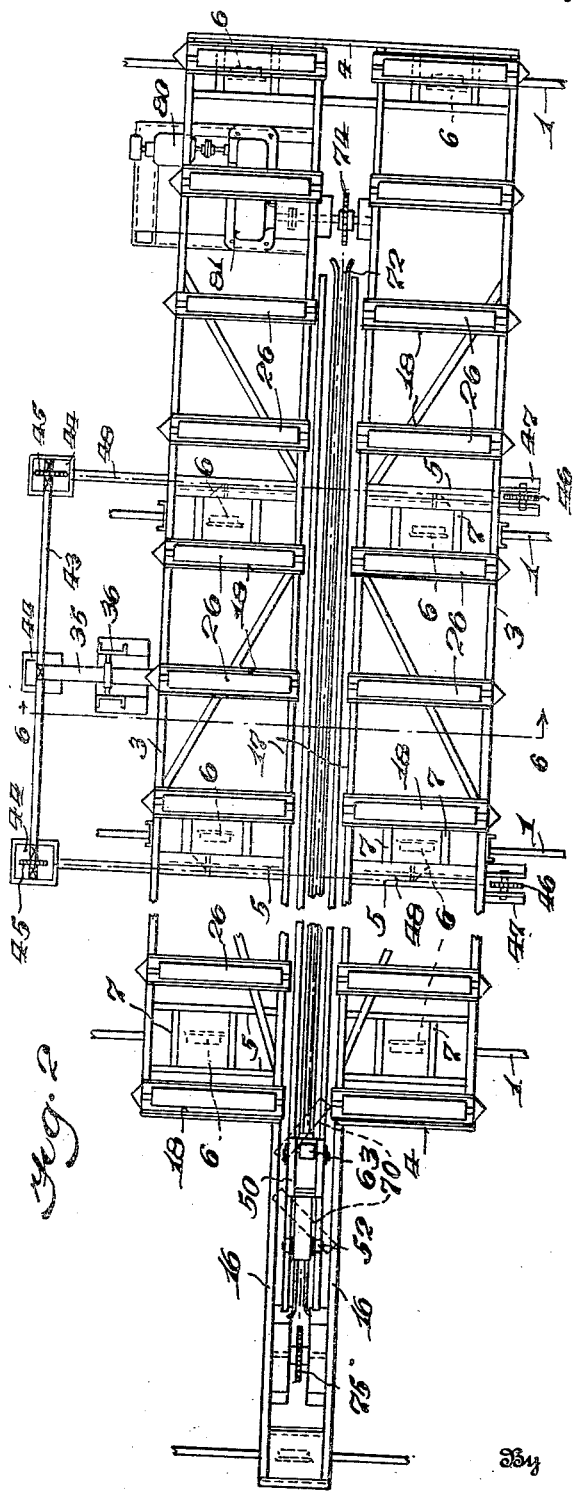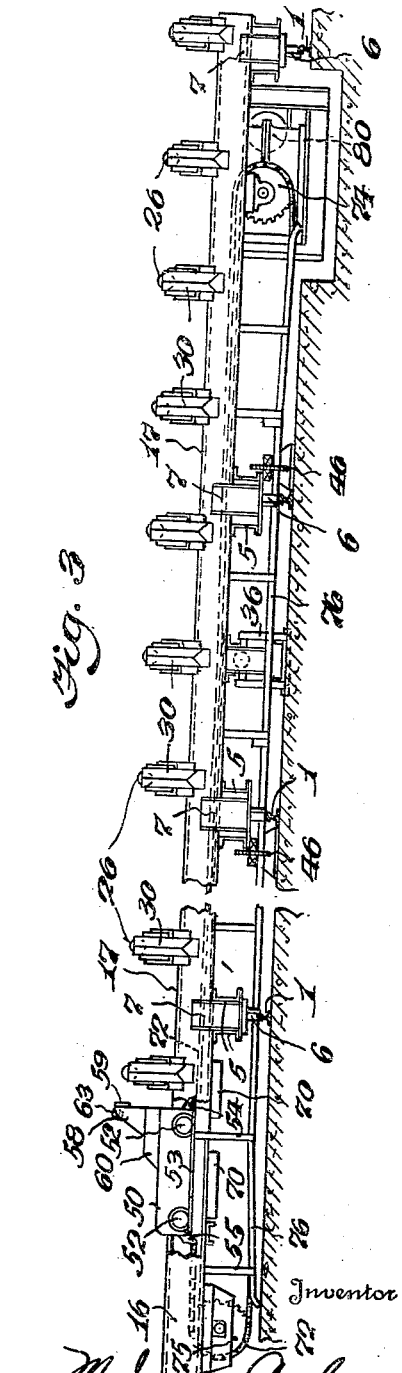

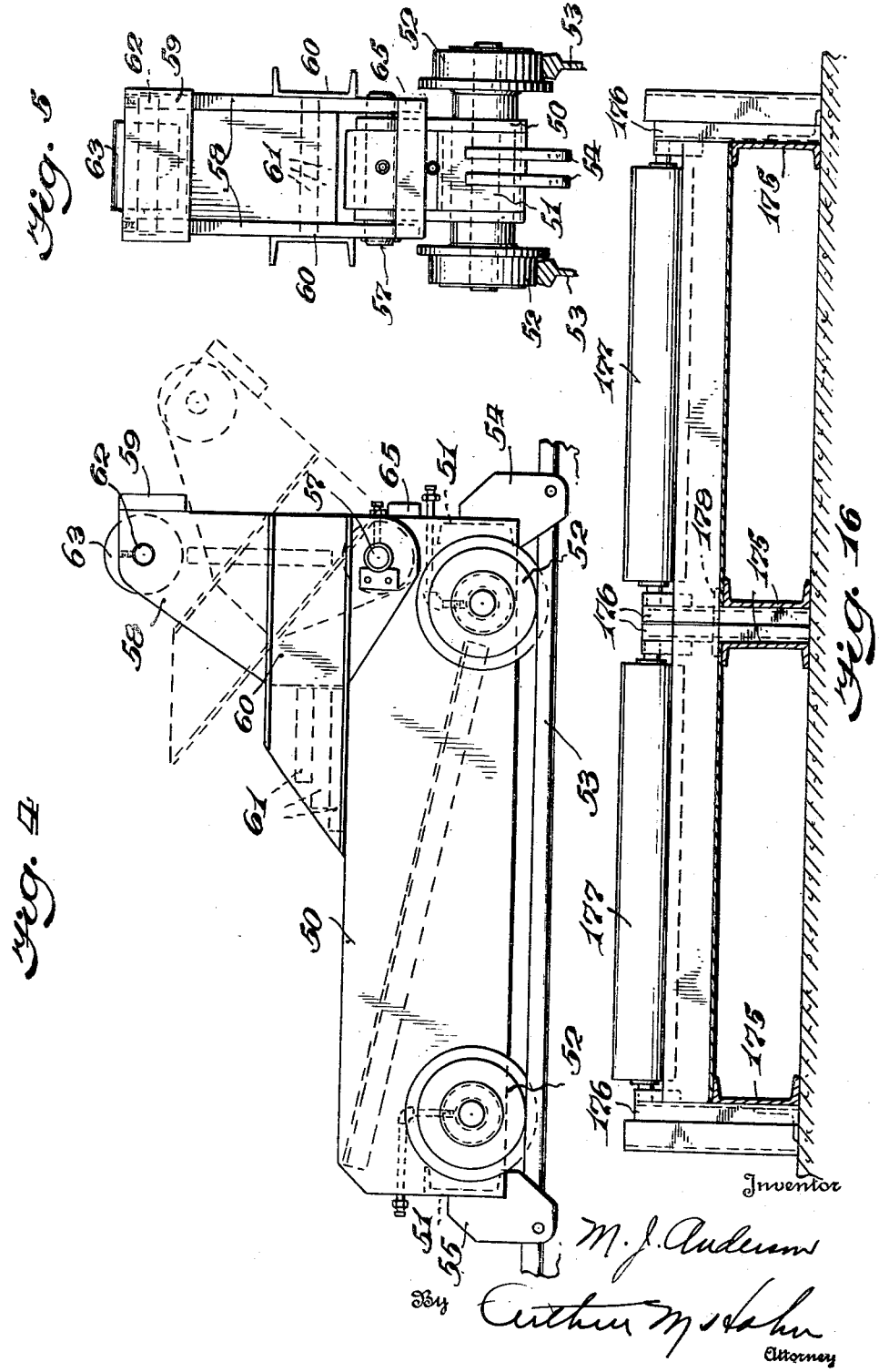

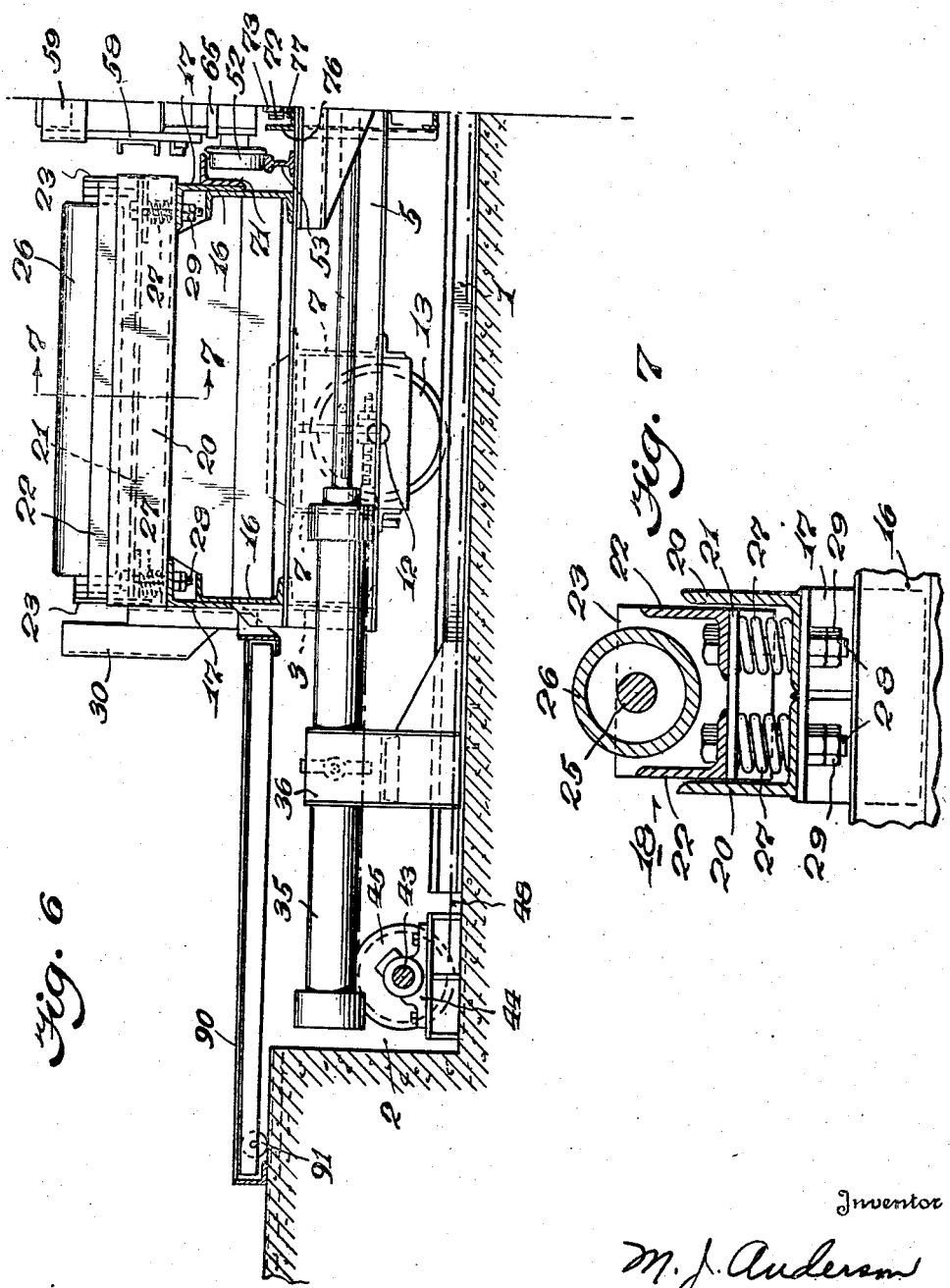

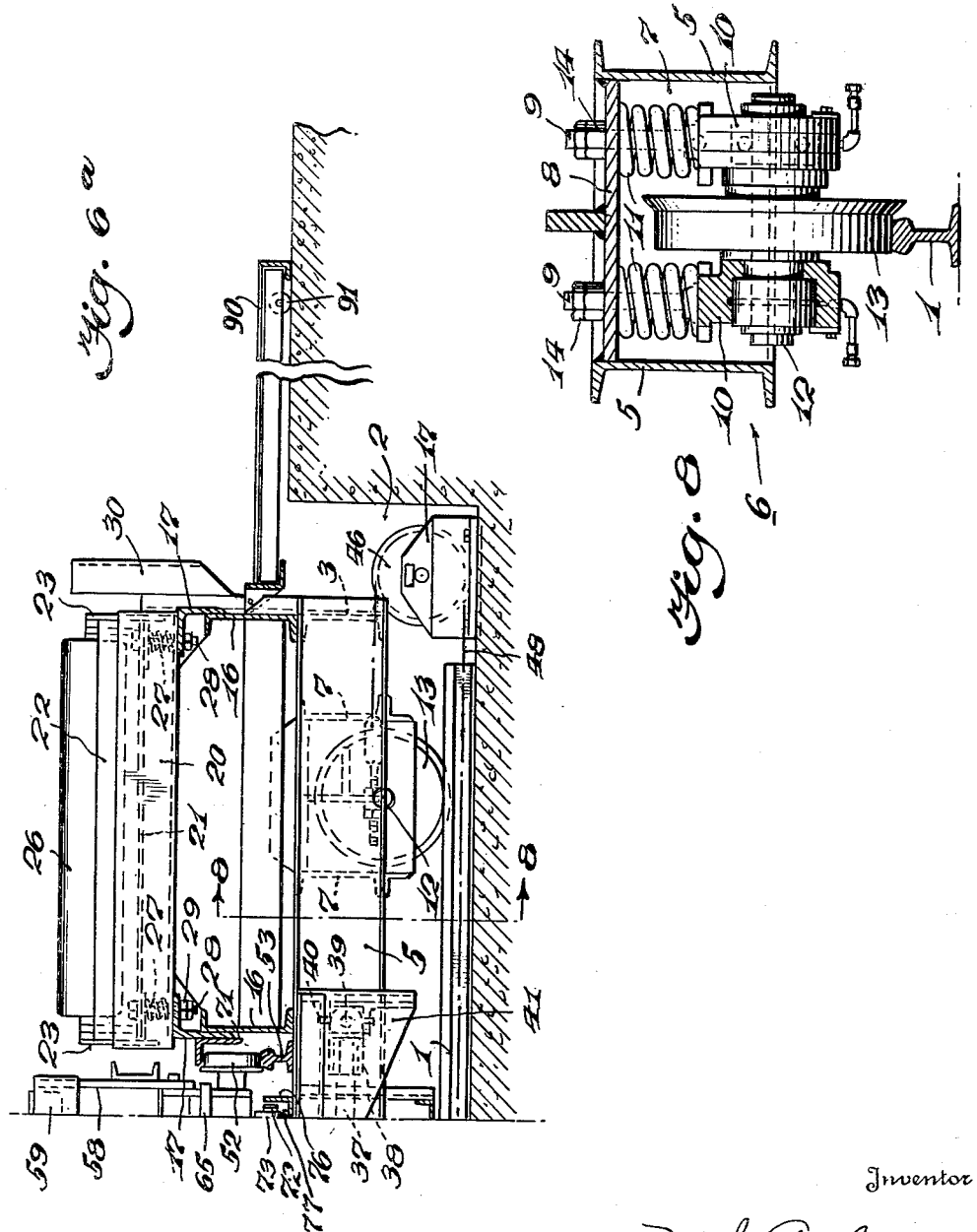

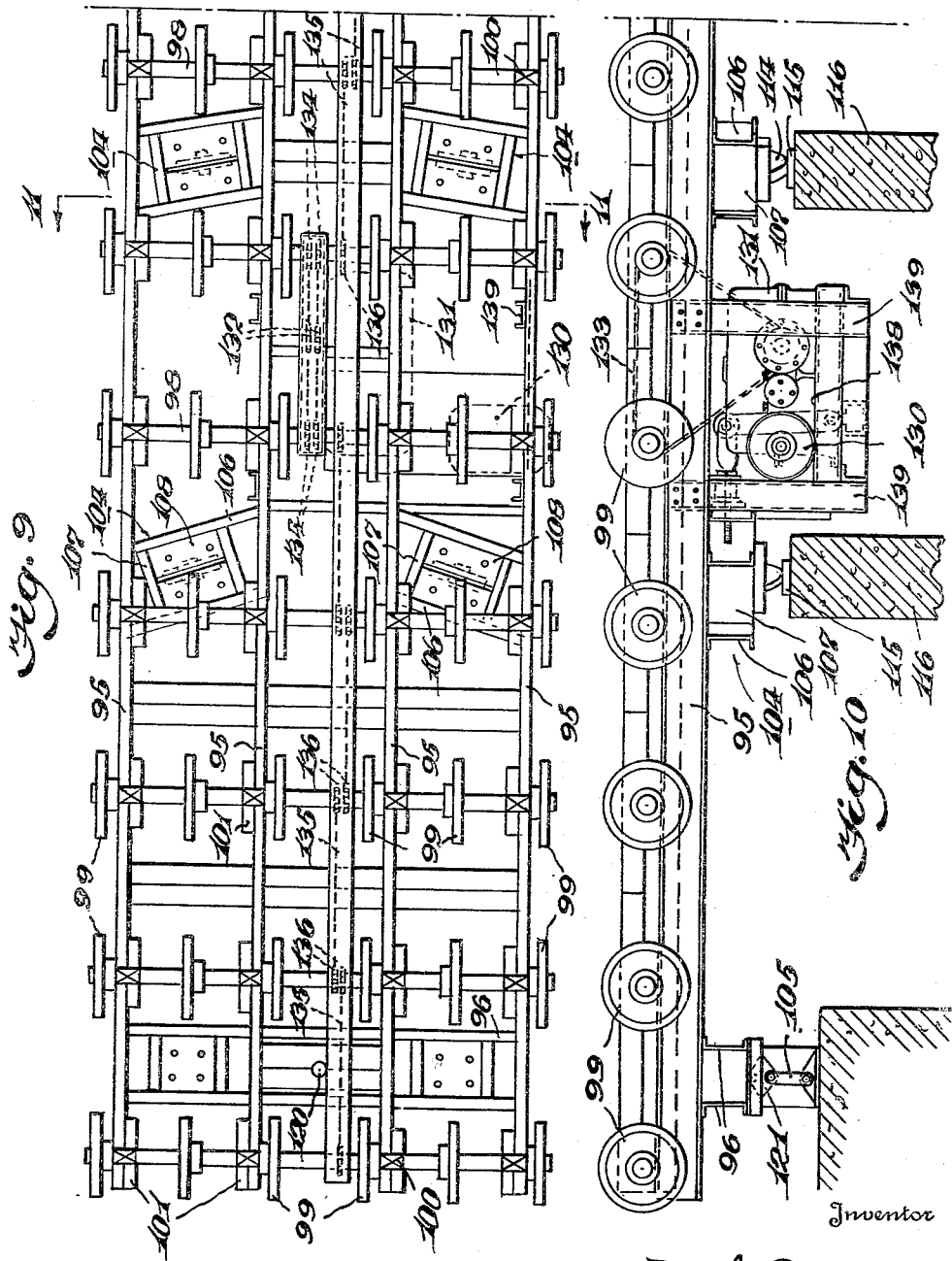

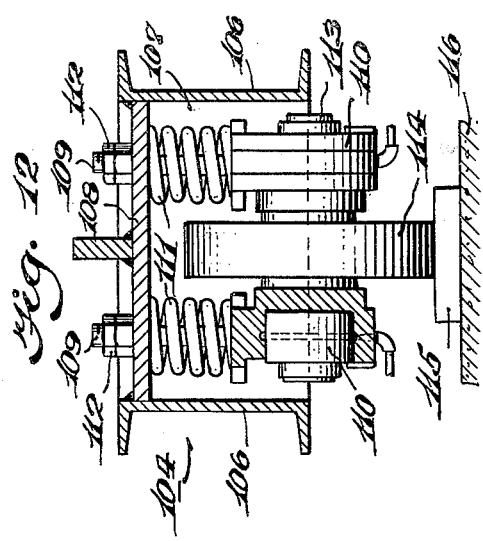
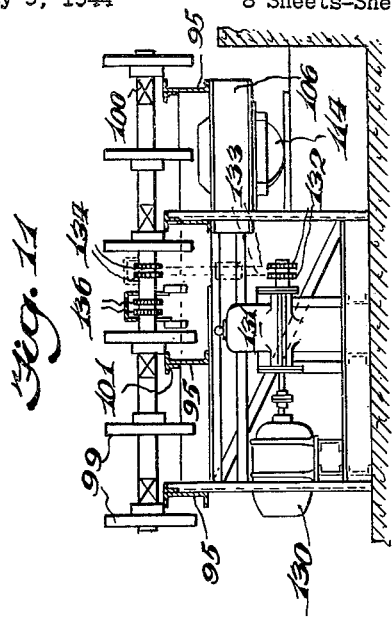
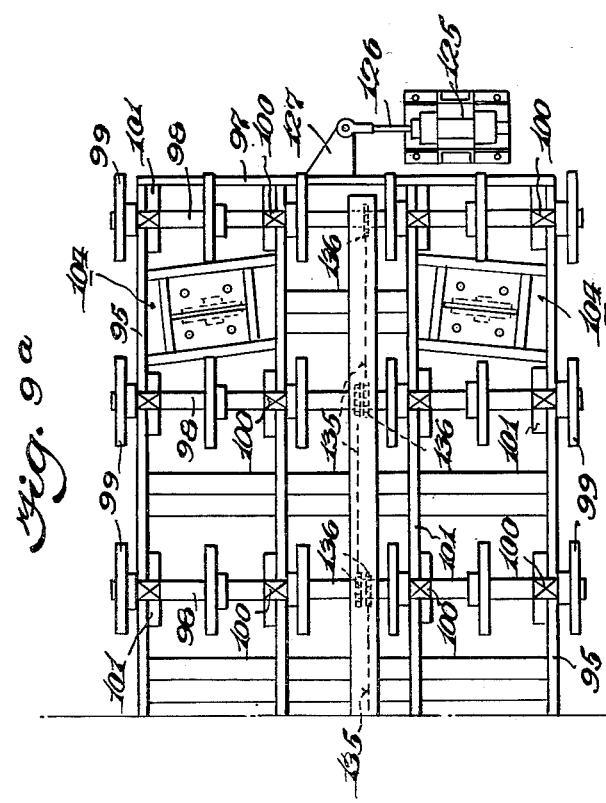
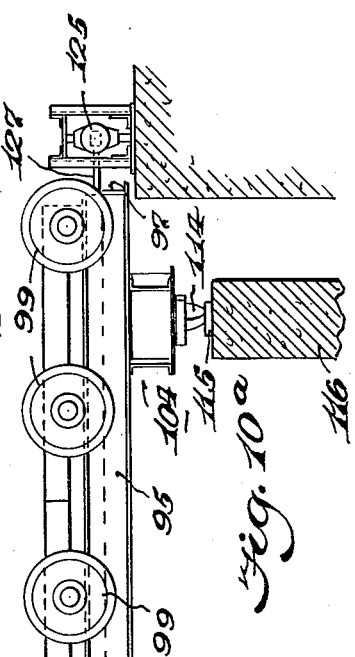

Nov. 19, 1946.  M. J. ANDERSON  2,411,407
CONVEYER SYSTEM
Filed May 9, 1944  8 Sheets—Sheet 8

Inventor
M. J. Anderson
Arthur M. Hahn
Attorney

Patented Nov. 19, 1946

2,411,407

UNITED STATES PATENT OFFICE 2,411,407

CONVEYER SYSTEM

Martin J. Anderson, Ellwood City, Pa., assignor to Mathews Conveyer Company, Ellwood City, Pa., a corporation of Pennsylvania Application May 9, 1944, Serial No. 534,772

9 Claims. (Cl. 198—82)

This invention relates to conveyers and has particular reference to a conveyer system for handling and accurately positioning heavy objects, such as large plates, for performing a work operation thereon.

While the conveyer system described hereinafter is capable of other uses, the illustrated form of my invention has been particularly embodied in a structure for accurately positioning large heavy plates, such as used for armor plate and/or in the construction of large ships, so that they may be easily and quickly cut into the desired sizes and shapes by means of welding torches, and the edges chamfered if so desired.

The conveyer system illustrated in the accompanying drawings is capable of accurately handling plates from $\frac{5}{16}$ inch to 3 inches thick, from 60 inches to 150 inches wide, and from 20 to 40 feet long. These plates are usually cut to a minimum size of 4 feet wide by 12 feet long, or to any intermediate size up to the full size of the original plate with the edges cut. The cutting operation is usually performed by gangs of welding torches that are mounted on a suitable support which moves over predetermined paths to cut the desired size and shape. It is thus obvious that the plates must be accurately positioned with respect to the torch support in order to cut the plates to the best advantage. It is also obvious that these plates, being of considerable weight due to their relatively large area and thickness, present a difficult problem to position them accurately with respect to the torch support, in a minimum of time and without the aid of large cranes and considerable manual labor.

It is the primary object of the present invention to provide a novel conveyer system which will position plates of the aforesaid character accurately with respect to the cutting torches and which will accomplish such result in a minimum of time and effort on the part of the operator.

Another object is to provide a conveyer system which shall include a loading table and a slitting table arranged end to end for the transfer of plates from the former to the latter, the loading table being movable transversely with respect to the slitting table, and the slitting table being pivotally mounted adjacent the receiving end thereof and capable of limited horizontal movement about said pivot to vary the position of plates received thereon as delivered by the loading table with respect to the cutting torches.

A further object is to provide a conveyer system which shall include a loading table and a slitting table of the aforesaid character and also a feed table and an unloading table also arranged end to end with respect to said slitting table. Plates may be ready on the loading table when operations are completed on the slitting table so that a new plate may move in simultaneously as a plate moves off the slitting table. The feed table, interposed between the slitting and unloading tables, moves the plate completely off the slitting table, thus leaving it free to receive the new plate and also free to be adjusted about its pivot.

With these and other objects in view, the invention may be stated to consist in the various novel features of construction and arrangement, or combination, all of which will be fully described hereinafter and pointed out in the appended claims.

In the drawings accompanying and forming a part of this application—

Fig. 1 is a top plan view of a conveyer system constructed in accordance with my invention;

Fig. 2 is a top plan view of the loading table unit;

Fig. 3 is a side elevation thereof;

Fig. 4 is a side elevation of the pusher for the loading table;

Fig. 5 is an end elevation thereof;

Figure 13:
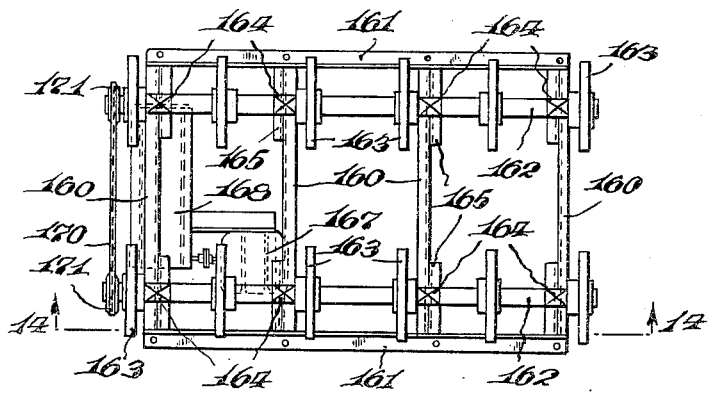
Figure 14:
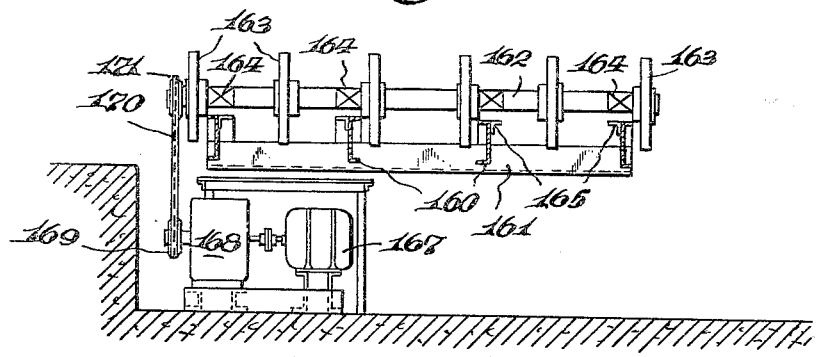
Figure 17:
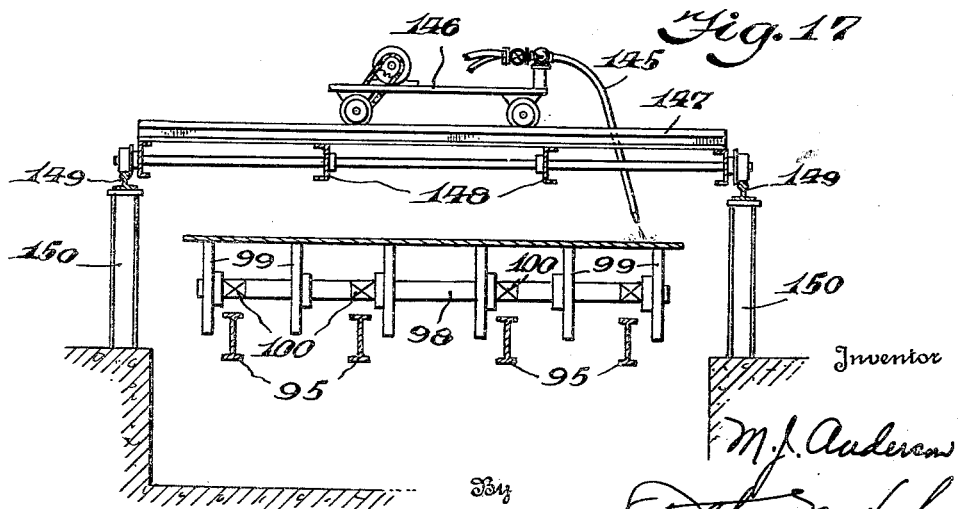

Fig. 6—6ª is a transverse sectional view taken on the line 6—6 of Fig. 2;

Fig. 7 is a cross-sectional view of one of the rollers and mounting therefor and is taken on the line 7—7 of Fig. 6;

Fig. 8 is a cross-sectional view through one of the wheel trucks for the loading table and is taken on the line 8—8 of Fig. 6ª;

Fig. 9—9ª is a top plan view of the slitting table with the cutting torches and supports therefor omitted;

Fig. 10—10ª is a side elevation thereof;

Fig. 11 is a transverse sectional view taken on the line 11—11 of Fig. 9;

Fig. 12 is a transverse sectional view through one of the trucks which support the slitting table;

Fig. 13 is a top plan view of the feed table;

Fig. 14 is an end elevation thereof;

Fig. 15 is a side elevation of the unloading table;

Fig. 16 is a transverse sectional view through the table taken on the line 16—16 of Fig. 15; and Fig. 17 is a transverse sectional view through the slitting table and showing one of the transverse cutting torch units in position.

Referring to Fig. 1, it will be noted that the structure comprises a loading table, a slitting table, a feed table and an unloading table, all arranged end to end in substantially longitudinal alignment. The loading table is adapted to receive from a crane (not shown) the plate to be cut and this table is movable transversely of the longitudinal axis of the system so that when the plate is transferred by a pusher element to the slitting table, the longitudinal cuts made by the cutting torches will be located between the disks on the slitting table. The slitting table, which serves as a work supporting table during the cutting operation, is provided with power-driven disks which receive and support the plate to be cut. As has been previously stated, this table is pivoted adjacent that end which is next to the loading table and is movable about said pivot within a limited arc. It is thus possible to dispose angularly the longitudinal axis of the slitting table to that of the loading table so that plates may be squared or accurately positioned on the slitting table with respect to the cutting torches. If realignment should be necessary, the power-driven disks on the slitting table may be reversed to transfer the plate back to the loading table, so that the necessary readjustments of the slitting table may be made, whereupon the plate is again transferred to the slitting table.

The plate remains stationary on the slitting table while the cutting and/or chamfering torches move longitudinally along and transversely of the plate to cut the same to the desired size and shape. The scrap is removed manually. After a large plate has been cut to the required number of pieces, the slitting table disks are power operated to transfer the plates to the feed table, which is also power operated, and thence to the unloading table, which is a gravity type conveyer unit. The short feed table interposed between the unloading and slitting tables insures the complete and rapid removal of the plates from the slitting table so that it is free to be reset for the next plate delivered from the loading table.

The details of the construction and operation of each of the units will now be described.

Loading table

The loading table is shown in Figs. 1-8 inclusive. This table consists essentially of a pair of laterally spaced, resiliently mounted roller conveyer sections that are mounted on a carriage which is capable of moving transversely of the longitudinal axis of the system, and a power-driven pusher element arranged between the conveyer sections for discharging the heavy plates from the conveyer sections onto the slitting table.

As illustrated in Fig. 6-6a, a plurality of spaced parallel rails 1 are mounted in a pit 2, so as to be below floor level, and these rails support and guide the carriage in its movement transversely of the longitudinal axis of the system. This carriage includes a rectangular frame formed from channel-shaped steel beams and having side members 3, end members 4, and a plurality of transversely disposed channel-shaped cross members 5. The carriage is supported on the rails 1 by a plurality of resiliently mounted wheel trucks 6, one of which is illustrated in detail in Fig. 8. As shown in Figs. 2 and 8, each wheel truck is disposed within a box-like structure formed by a pair of spaced cross members 5, 5 and short channel-shaped pieces 7, 7 welded at right angles thereto. The top of this rectangular box is closed by a plate 8, through which projects a pair of threaded studs 9, 9 which carry bearings 10, 10 at their lower ends. A heavy coil spring 11 encircles each stud and is interposed between the under surface of plate 8 and bearing 10. This construction provides a resilient mounting for an axle 12 journaled in the bearings, and a flanged wheel 13 interposed therebetween. Nuts 14 are applied to each stud and preferably the springs 11, 11 are precompressed to an appreciable extent to stiffen the resilient action of the mounting.

Mounted on the upper surface of the carriage are two pairs of longitudinally extending channel-shaped rails 16, 16 and to the upper side portion of each rail is welded an angle iron 17. Each angle iron is substantially coextensive with its rail and has the horizontal flange thereof spaced vertically from the top flange of the rail as shown in Fig. 6-6a. These angle irons 17 support a plurality of transversely disposed roller units 18. A detail of one of the roller units is illustrated in Fig. 7 and a description of one will serve for all. Each unit includes a pair of angle irons 20, 20 welded across a pair of the supports 17 and so arranged as to define a transversely disposed channel. Positioned within the channel is a plate 21, to which is welded a second pair of angle irons 22, 22. A vertically disposed plate 23 is welded across each end of plate 21 and the ends of the angle irons 22, 22. These vertical plates 23 form supports for an axle 25, on which a conveyer roller 26 is journaled in the usual manner. The box-like structure that supports the roller and which includes the plate 21 and angle irons 22, 22 is vertically movable with respect to the angle irons 17, 17 and 20, 20. As clearly shown in Figs. 6-6a and 7, each end of this box-like structure rests on a pair of coil springs 27, 27 interposed between plate 21 and the horizontal flanges of angle irons 20, 20. A bolt 28 extends through each horizontal flange of an angle iron 22, plate 21, coil spring 27, and the horizontal flanges of angle irons 20 and 17. A pair of nuts 29 applied to the protruding threaded end of the bolt serves to precompress and lock the spring 27 in precompressed adjustment. In this manner, the individual rollers are resiliently mounted and free to move vertically so that the load will be substantially evenly distributed thereon. Suitable vertical guards 30 are welded to members 16 and 17 adjacent the outer end of each roller unit.

The carriage is moved back and forth along the rails 1 by a hydraulic cylinder 35 that is pivotally mounted in a U-shaped support 36 as shown in Fig. 6-6a. Connected to the piston therein is a piston rod 37 that is fitted at its outer end with a clevis 38 which is pivotally connected along a horizontal axis 39 with a trunnion block 40. This block is pivoted along a vertical axis to a bracket 41 that is secured to the central portion of the carriage. Suitable controls (not shown) of standard design are provided for admitting to and exhausting hydraulic fluid from the cylinder to move the piston and carriage in either direction as determined by the operator.

Since the carriage is moved by a single hydraulic cylinder and piston which is connected to the central portion of the carriage, it is desirable to equalize the thrust on the carriage to insure a straight back-and-forth movement irrespective of the distribution of the weight on the conveyer sections. To this end, there is provided an equalizing mechanism which includes a shaft 43 (Fig. 2) journaled in bearings 44 and arranged parallel with the longitudinal axis of the carriage. Each outer end of this shaft is fitted with a sprocket 45. Similar sprockets 46, 46 are journaled in bearing blocks 47, 47 in transverse alignment at the opposite side of the carriage. A chain 48 is engaged over each pair of sprockets 45, 46, one end of the chain being attached to a wheel truck 6 at one side of the carriage, and the other end of said chain being attached to a corresponding wheel truck at the opposite side of the carriage. It is thus obvious that if one end of the carriage tends to advance faster than the other end, the chain 48 will transmit this motion to shaft 43 and the other sprocket chain, thence to the other end portion of the carriage, thus forcing the carriage to square itself on the tracks 1.

The mechanism for discharging the plates or other objects from the conveyer sections on the loading table includes a longitudinally movable pusher element that is adapted to engage one end of the plate and force it along the conveyer rollers and onto the slitting table. As shown in Figs. 4 and 5, the pusher element comprises a body portion formed of a pair of spaced parallel side plates 50, 50 and end channel-shaped members 51, 51 welded or otherwise secured thereto. Each end portion of the body is supported by a pair of flanged wheels 52 that are adapted to ride upon rails 53, to be referred to hereinafter. A pair of laterally spaced lugs 54 secured to the forward lower end wall of the body portion and a similar pair of lugs 55 is secured to the rear wall thereof. A chain, to be referred to hereinafter, is connected to these lugs for moving the pusher element longitudinally along the rails 53. Pivotally mounted on a shaft 57 that is located at the forward upper portion of the body portion, is a pair of upwardly extending side plates 58 having a pusher bar 59 welded thereto across the upper end thereof. A horizontally disposed channel-shaped extension 60 is welded to each side plate 58 and a plurality of stop plates 61 are welded between the rear ends of these extensions and normally engage the top surfaces of the side plates 50, 50 to take the thrust when pusher bar 59 engages the end of a plate to move it along the conveyer sections. Mounted between the upper end portions of the side plates 58 is an axle 62 on which is journaled a roller 63 the peripheral surface of which is slightly above the top edge of the side plates and pusher bar 59. As indicated in dotted lines in Fig. 4, the side plates 58 and other elements carried thereby can pivot forwardly about shaft 57 to a limited extent, or until the forward edges of side plates 58 engage a transverse bar 65 that is welded across the side plates 50, 50 of the body portion. When in this forwardly tilted position, the upper surface of roller 63 will be disposed substantially tangent to the plane of the upper surfaces of the conveyer section rollers. In other words, it may often happen that a short plate will be moved off the loading table by the pusher element, and meanwhile another plate will be placed on the table while the pusher element is at the discharge end of the table. By permitting the side plates 58 and associated parts to tilt forwardly, the pusher element may be retracted beneath the second plate and the roller 63 will engage the under surface of the plate to prevent scratching or binding or other damage while it is passing beneath the plate. After it clears the plate, it will automatically pivot to an erect position by gravity so as to be able to engage the pusher bar 59 with the end surface of the second plate.

Referring now to Figs. 2, 3, and 6-6ª, it will be noted that the inner pair of channel-shaped members 16, 16 is extended to the left (as viewed in Figs. 2 and 3) to a point beyond the end of the conveyer sections. The aforementioned rails 53, 53 are mounted on the carriage between the conveyer sections and these rails also extend beyond the conveyer sections and are supported by diagonally disposed cross members 70 welded to the lower surfaces of the channel-shaped members 16, 16. In order to prevent the pusher element from tipping on the rails while in operation, an angle iron 71 (Fig. 6-6ª) is welded or otherwise secured to each angle iron 17 so that the horizontal flange thereof overlaps the upper surface of the wheels 52, 52 of the pusher element on each side thereof. The pusher element is moved along the rails 53 by a chain having side links 72, 72 and longitudinally spaced rollers 73 between said links. This chain passes around a sprocket 74 journaled beneath the carriage adjacent the discharge end of the conveyer sections, and is fastened to the aforementioned lugs 54 on the pusher element. The other end of the chain passes around a similar sprocket 75 that is journaled beneath the aforementioned channel-shaped extensions 16, 16, and this end of the chain is connected to the lugs 55 on the pusher element. As shown in Fig. 6-6ª, the chain is positioned within and guided by a channel-shaped member 76 extending longitudinally of the carriage and arranged between the rails 53. The rollers 73 of the chain move over a track 77 that is positioned in the member 76. It will be understood, of course, that the teeth of sprockets 74 and 75 engage the rollers 73 to propel the chain and the pusher element. The source of power for driving the chain comprises a reversible electric motor 80 having its drive shaft coupled to a reduction gear 81, which in turn is operatively connected to the shaft on which the sprocket 74 is mounted. The motor is manually controlled by a standard circuit (not shown) commonly referred to as "push button start-limit switch stop." These limit switches are indicated on Fig. 1 at 82 and 83. The operator pushes a button to energize the motor circuit and the pusher element continues to move until it engages the limit switch 82 (unless in the meantime the operator should push an emergency "stop" button) whereupon the motor circuit is opened. By this time, the plate or other object will have been discharged from the loading table conveyer sections onto the slitting table. The motor is now energized in a reverse direction by another button, and when the pusher element engages limit switch 83, the motor circuit is again opened and the pusher element stopped in position ready to engage the edge of the next plate or object that has been positioned on the roller conveyer sections.

Since a part of the loading table is mounted below floor level and is movable back and forth in the pit, it is desirable to cover the gap between the carriage and floor for safety reasons and also to provide easy access to the conveyer sections by the workmen. To this end, there are provided a plurality of platforms 90 that are connected along the sides of the carriage and its extension. These platforms are long enough to overlie the floor even when the carriage is moved to its maximum positions by the hydraulic piston and cylinder. As shown in Fig. 6-6ª, the outer ends of the platforms are supported by rollers 91 which engage the floor.

In operation, a suitable crane (not shown) deposits a plate onto the conveyer rollers 26 with the longitudinal axis of the plate as nearly parallel to that of the conveyer sections as practicable. The platforms 90 permit the workmen to closely approach the conveyer sections and guide the plates as they are being lowered by the crane and also to remove the chain slings or tongs after the plate is deposited on the rollers. At this point it will be noted that the spring-mounted rollers 26 and the spring-mounted wheels 13 for the carriage effectively absorb the tremendous impact of depositing a heavy plate onto the conveyer rollers, and thus greatly prolong the life of the roller bearings and other parts of the entire structure. The guards 30 and the box-like construction around each roller 26 prevent the crane C-hooks or tongs from accidentally being caught in the loading table structure with resultant damage thereto. After the plate is placed on the rollers and the crane chain slings or tongs have been removed therefrom, the operator actuates the hydraulic cylinder to move the entire carriage backward or forward transversely of the longitudinal axis of the system to approximately position the plate in alignment with the cutting torches over the slitting table. When the plate is thus positioned, the pusher element is then energized, as previously explained, to push the plate from the loading table onto the slitting table. As will be described in detail, the slitting table may be pivoted about a vertical axis to exactly align the plate with the cutting torches and the longitudinal axis of the conveyer system.

*Slitting table*

The slitting table is illustrated in Figs. 9–12 inclusive and 17 and in general comprises a suitable framework in which are mounted a plurality of power-driven disks, the framework being pivotally mounted at the receiving end and movable horizontally through a limited arc at the discharge end to permit the plates received thereon to be accurately aligned with suitable cutting torches that are arranged in operative relation to the table.

The framework comprises a plurality of transversely spaced and longitudinally disposed channel-shaped members 95 and suitable cross members including a pair of transversely arranged channel-shaped members 96 welded or otherwise secured to the under surfaces of members 95 adjacent the receiving end of the table. A channel-shaped cross member 97 is also welded across the discharge ends of the members 95. At suitably spaced intervals are a plurality of transversely disposed shafts 98 each of which has mounted thereon a plurality of disks 99 that are adapted to receive and support a plate to be cut. These shafts are journaled in bearings, indicated generally at 100, which are mounted on the upper surfaces of members 95 and on a short angle iron 101 welded thereto to increase the horizontal areas of support for the bearings.

The slitting table is supported by a plurality of angularly disposed wheel trucks 104 at the central portion and discharge end, while the receiving end is supported by a plurality of vertically disposed and pivotally mounted links 105. A detail of one of the wheels is illustrated in Fig. 12 and a description of one will serve for all. As shown in Fig. 9–9ª, each wheel truck is mounted in a box-like structure comprising angularly disposed channel-shaped members 106 welded between a pair of longitudinal members 95 and cross members 107 welded to members 106. A rectangular plate 108 is welded into the top of the box-like structure and projecting through this plate are a plurality of threaded studs 109 which carry bearings 110 at their lower ends. A coil spring 111 encircles each stud and is interposed between the bearing and plate 108. These springs are precompressed by nuts 112 applied to each stud. An axle 113 is journaled in the bearings 110 and a wheel 114 is mounted thereon between the bearings. These wheels each engage a track 115 that is mounted on a vertically disposed masonry support 116 which rises from the floor of a pit over which the table is mounted. The receiving end of the table is adapted to move about a pivot 120 (Fig. 9), and since the discharge end of the table moves laterally only a maximum distance of substantially 6 inches to each side of the longitudinal axis, it is obvious that the receiving end of the table adjacent the pivot 120 will move only a very small fractional part of this distance. Therefore, instead of wheel trucks, this end of the table is supported by the aforementioned links 105 (Fig. 10) each of which is pivotally connected at one end to a suitable mounting on the floor and at the other end to a triangular-shaped projection 121 that depends from a plate welded to the under surfaces of transverse channels 96, 96.

The table is shifted laterally about pivot 120 by a fluid-operated cylinder 125 (Fig. 9ª) having its piston rod 126 pivotally connected to a triangular-shaped bracket 127 that projects from the transverse channel-shaped member 97. Suitable controls (not shown) of standard construction serve to admit to and exhaust fluid from the cylinder to move the table laterally about pivot 120 to any desired extent within the aforementioned limits.

The driving mechanism for the disks 99 comprises an electric motor 130 (Figs. 10 and 11) that is operatively connected through a reduction gear 131 to a pair of laterally spaced driving sprockets 132. A pair of chains 133 is engaged over this sprocket and similar sprockets 134, 134 on a pair of adjacent shafts 98, 98. Each shaft 98 is connected to the next adjacent shaft by a chain 135 engaged over sprockets 136 to drive all of said shafts and the disks 99 mounted thereon. The motor 130 and reduction gear 131 are mounted on a platform 138 that is suspended below the table frame by vertically disposed channel-shaped members 139. The motor is preferably of the reversing type so that through a suitable control mechanism (not shown) of standard construction the operator may drive the shafts 98 and disks 99 in either direction to move the plate from the loading table onto the slitting table, or return it to the loading table for re-positioning on the slitting table.

As shown in Fig. 17, a conventional cutting torch 145 is mounted on a motor-driven wheeled carriage 146 that is movable on rails 147 transversely of a carriage 148, which in turn is movable longitudinally along tracks 149 that are supported at each side of the slitting table by standards 150 rising from the floor. The carriage 148 may be moved manually or by any suitable source of power (not shown since the details of the flame-cutting mechanism or other operation to be performed on the plate while on the slitting table are not considered to be a part of this invention).

In operation, it is desirable to position the plate or other object on the slitting table in such manner that the longitudinal and transverse cuts to be made by the cutting torches 145 will lie between the disks 99 so they will not be damaged by the heat. The loading table is therefore moved transversely, as previously described, to position the longitudinal line or lines of the cut on the plate so that they will lie between the disks 99. If it appears that the line or lines of cut are positioned at as light angle instead of being parallel to the longitudinal axis of the system (as is often the case when depositing the plate on the loading table by the crane), the slitting table may be swung about pivot 120, as previously described, to properly position the plate. When the plate is pushed from the loading table, the slitting table is preferably aligned with the longitudinal axis of the system so the plate will be moved in a line tangent to the disks 99 to avoid damaging either the plate or the rollers. After the plate is transferred to the slitting table, it will not usually be exactly aligned with the cutting torches. In other words, the plate may be skewed with respect to the longitudinal axis of the system. Exact alignment of the plate is accomplished by swinging the slitting table (as well as the plate thereon) in a horizontal arc about the vertical axis of pivot 120 until the plate is properly positioned with respect to the cutting torches.

Should the operator err in judgment or should the plate be badly skewed in its original position on the loading table, the plate can be returned to the loading table by reversing the drive of motor 130, which is preferably done after the slitting table has been readjusted about its pivot to correct the position of the plate so that when it is returned to the slitting table the second time it will be accurately positioned for the cutting torch or torches. It is also desirable to return the plate or plates to the loading table to reset them to permit an additional cut or cuts to be made thereon when the size is such that the cutting line or lines would be over the disks. In other words, it is possible that a plate would be positioned initially on the slitting table, that one or more cuts could be made between the disks, while one or more additional lines of cut would be directly over or very close to the disks. When this happens, the lines of cut between the disks are made, then the incompleted lot of plates are returned to the loading table and reset on the slitting table so that the final cut or cuts can be made without interference with the disks. After the longitudinal cuts have been made, the disks 99 can be energized, if necessary, to position the plates so that the transverse cuts will be made between the shafts 98.

It is obvious that a second carriage carrying cutting torches may be used so that, if desired, the plates may be end trimmed and/or cut to length simultaneously with the slitting operation. In other words, as the slitting carriage advances longitudinally along the plate, the second carriage may be set to cut the end of the plate and when this end cut has been completed, the carriage may be again set to cut the sheet length as soon as the slitting carriage has advanced enough to permit cutting a sheet length.

When all cutting or other operations have been completed on the slitting table, the scrap is removed manually, and the disks are again energized to propel the plates to the feed table.

*Feed table*

The feed table is illustrated in Figs. 1, 13 and 14. This table is a relatively short power-driven table, the purpose of which is to permit conveying the cut plates far enough to leave the slitting table free for receiving a new plate and the slitting table to be reset about its pivot. Unless the feed table were included in the system, the cut plates might overhang the unloading table far enough to block the free use of the slitting table.

As shown in Figs. 13 and 14, this table comprises a stationary rectangular-shaped framework which includes a plurality of longitudinal channel-shaped members 160 and transverse angle-shaped end members 161. A pair of transversely disposed shafts 162, having disks 163 mounted thereon, is journaled in bearings 164. These bearings are mounted on the top surfaces of the members 160 and short angle irons 165 that are welded to the sides of the members 160 to increase the areas of support for the bearings. In a pit below floor level is the drive mechanism for the feed table which includes an electric motor 167 operatively connected through a reduction gear 168 to a drive sprocket 169. This sprocket is connected by a chain 170 to a sprocket 171 on each of shafts 162.

The feed table may be operated continuously while the system is being used, or intermittently whenever the plates are to be removed from the slitting table. Suitable controls (not shown) of standard construction are provided for starting and stopping motor 167, and if desired this motor may be of the reversible type, although ordinarily this is unnecessary.

*Unloading table*

The unloading table is illustrated in Figs. 1, 15 and 16 and comprises essentially a two-section idle roller type conveyer having the rollers protected and so designed as to permit the entry of crane hooks for removing the cut plates therefrom. This table is also disposed in longitudinal alignment with the preceding tables and it is mounted directly on the floor so that the tops of the rollers are in substantially the same horizontal plane as the tops of the disks 163 of the feed table, the tops of the disks 99 of the slitting table, and the tops of rollers 26 of the loading table.

As shown in Figs. 15 and 16, the unloading table comprises a plurality of transversely spaced and longitudinally extending channel-shaped members 175. These members are preferably arranged as two pairs, each pair having the flanges thereof facing inwardly toward each other, as clearly shown in Fig. 16, to provide smooth outer surfaces. Welded or otherwise secured to the outer surfaces of each pair of members are a plurality of vertically disposed and transversely aligned channel-shaped axle supports 176 between which are journaled rollers 177. The two pairs of channel members 175 are positioned closely adjacent each other and are tied together at suitable intervals by straps 178 welded across the tops of the inner adjacent pair of members. A plurality of plates 179 arranged transversely between each pair of channel members and secured to the top surfaces thereof provide a smooth surface beneath the rollers. An angle iron guard 180 is also welded to the outwardly extending flanges of the roller supports 176. These guards and the plates 179 effectively prevent the crane hooks from becoming caught in the conveyor when the cut plates are being removed therefrom.

As shown in Figs. 1 and 15, a back stop 181 is positioned at the end of the unloading table to prevent the cut plates from leaving the table should they tend to overrun the conveyer rollers on the unloading table.

The cut plates are removed from the slitting table by the disks 99 and the disks 163 of the feed table. These power-driven disks position the cut plates onto the rollers of the unloading table. Because of the relatively wide spacing between the rollers on this table and the aforementioned plates 179 and guards 180, heavy lifting hooks may be used to lift the loads off it by means of crane or other suitable equipment. Provision is made so that such lifting means will not catch at the sides of the table or in the space between rollers. If further conveying is desired, the table may be sufficiently lengthened and suitable grade provided. It may be made level if stopping of plates is desired close to the receiving end or it may be made, as in the case of the one illustrated, with a slight grade. This does not permit free travel, but does facilitate separation in case there are short lengths on the table. This separation is desirable so that the forward plate may be moved ahead slightly to give desired clearance between the plate being lifted and the one remaining on the table. This horizontal movement of a plate is also desirable for suitable centering of short plates onto the lifting fingers which are spaced to suit the roller centers.

What I claim is:

1. A conveyer system for handling and accurately positioning relatively large and heavy objects including a loading table and a slitting table arranged end to end for the transfer of the objects from one to the other, means for moving said loading table transversely of the longitudinal axis of the system to substantially align an object thereon with said slitting table, means for swinging said slitting table about a vertical axis to further align the object with respect to said longitudinal axis, and means for transferring the object from the loading table to the slitting table.

2. A conveyer system for handling and accurately positioning relatively large and heavy objects including a loading table and a slitting table arranged end to end for the transfer of the objects from one to the other, means for moving said loading table transversely of the longitudinal axis of the system to substantially align an object thereon with said slitting table, said slitting table being pivotally mounted for movement about a vertical axis at a point adjacent the receiving end thereof, means for moving the discharge end of said slitting table in an arc about said vertical axis to further align the object with respect to said longitudinal axis, and means for transferring the object from the loading table to the slitting table.

3. In a conveyer system for handling and accurately positioning relatively large and heavy objects, a loading table comprising two transversely spaced and longitudinally extending lines of conveyer rollers, means for moving said loading table transversely of the longitudinal axis of the system to align an object thereon with said axis, and a pusher element arranged between said two lines of rollers and movable longitudinally therealong to engage and move the object along said longitudinal axis.

4. A conveyer system for handling and accurately positioning relatively large and heavy objects including a loading table and a slitting table arranged end to end for the transfer of the objects from one to the other, said loading table having two transversely spaced and longitudinally extending lines of conveyer rollers, each of said rollers being resiliently mounted on said table, means for moving said loading table transversely of the longitudinal axis of the system to substantially align an object thereon with said slitting table, means for swinging said slitting table about a vertical axis to further align the object with respect to said longitudinal axis, and a pusher element arranged between said two lines of rollers and movable longitudinally therealong for transferring the object from the loading table to the slitting table along said longitudinal axis.

5. A conveyer system for handling and accurately positioning relatively large and heavy objects including a loading table and a slitting table arranged end to end for the transfer of the objects from one to the other, means for moving said loading table transversely of the longitudinal axis of the system to substantially align an object thereon with said slitting table, said slitting table being pivotally mounted for movement about a vertical axis at a point adjacent the receiving end thereof, means for moving the discharge end of said slitting table laterally to further align the object with respect to said longitudinal axis, a plurality of power-driven rotary elements on said slitting table for receiving and supporting the object thereon, means for transferring the object from the loading table to the power-driven elements on the slitting table, and means for driving said rotary elements in either direction for assisting in the transfer of the object from the loading table or for returning the object to the loading table.

6. A conveyer system for handling and accurately positioning relatively large and heavy objects including a loading table and a slitting table arranged end to end for the transfer of objects from one to the other, said loading table having two transversely spaced and longitudinally extending lines of conveyer rollers, said slitting table having a plurality of power-driven rotary elements for receiving and supporting an object on said table, means for moving said loading table transversely of the longitudinal axis of the system to align an object thereon with said slitting table, means for swinging said slitting table laterally about a fixed vertical pivot to further align the object with respect to said longitudinal axis, a pusher element arranged between said two lines of rollers and movable longitudinally therealong for transferring the object from the loading table along said longitudinal axis to the slitting table, and means for driving said rotary elements in either direction for assisting in the transfer of the object from the loading table or for returning the object to the loading table.

7. In a conveyer system for handling and accurately positioning relatively large and heavy objects, a loading table comprising a wheel-supported carriage movable transversely of the longitudinal axis of the system, said carriage having two transversely spaced and longitudinally extending lines of conveyer rollers thereon for supporting an object for movement along said longitudinal axis, means for moving said carriage transversely to align an object thereon with said longitudinal axis, a pusher element arranged between said two lines of rollers and movable longitudinally along said carriage to engage and move said object along said axis, said pusher element having a pivotally mounted portion adapted to yield upon engagement with an object on its return stroke and pass therebeneath, and power means for actuating said pusher element to reciprocate it back and forth along said carriage.

8. In a conveyer system for handling relatively large and heavy objects, apparatus for aligning an object with respect to the longitudinal axis of the conveyer system comprising a loading table movable transversely of said longitudinal axis, a slitting table arranged at one end of said loading table and pivotally mounted for movement about a vertical axis, means for moving said loading table transversely of said longitudinal axis for approximately aligning an object thereon with said slitting table, means for transferring said object from said loading table along said longitudinal axis to said slitting table, and means for moving said slitting table in an arc about said vertical axis to position said object in alignment with said longitudinal axis.

9. In a conveyer system for handling relatively large and heavy objects, apparatus for aligning an object with respect to the longitudinal axis of the conveyer system comprising a loading table having two transversely spaced and longitudinally extending lines of conveyer rollers and a pusher element arranged between said lines of rollers and movable longitudinally along said loading table, said loading table being movable transversely of said longitudinal axis, a slitting table arranged at one end of said loading table and having a plurality of transversely disposed shafts each carrying disks arranged to support an object and transfer it along said longitudinal axis, said slitting table being pivotally mounted for movement about a vertical axis, means for moving said loading table transversely of said longitudinal axis for approximately aligning an object thereon with said slitting table, means for moving said pusher to transfer said object from said loading table along said longitudinal axis to said slitting table, and means for moving said slitting table in an arc about said vertical axis to position said object in alignment with said longitudinal axis.

MARTIN J. ANDERSON.